(12) United States Patent
Lee

(10) Patent No.: US 8,760,861 B2
(45) Date of Patent: Jun. 24, 2014

(54) MOUSE STRUCTURE

(75) Inventor: Tsung-Shih Lee, New Taipei (TW)

(73) Assignee: Cheng UEI Precision Industry Co., Ltd., New Taipei (TW)

( * ) Notice: Subject to any disclaimer, the term of this patent is extended or adjusted under 35 U.S.C. 154(b) by 93 days.

(21) Appl. No.: 13/489,427

(22) Filed: Jun. 5, 2012

(65) Prior Publication Data

US 2013/0321999 A1 Dec. 5, 2013

(51) Int. Cl.
*H05K 5/00* (2006.01)
*H05K 7/00* (2006.01)
*G06F 1/16* (2006.01)
*G06F 3/033* (2013.01)
*G09G 5/08* (2006.01)

(52) U.S. Cl.
USPC ........................................ 361/679.4; 345/163

(58) Field of Classification Search
USPC ............... 361/679.4, 679.1, 679.18; 345/163, 345/164, 165, 166, 167
See application file for complete search history.

(56) References Cited

U.S. PATENT DOCUMENTS

| | | | | |
|---|---|---|---|---|
| 6,157,370 A * | 12/2000 | Kravtin et al. | | 345/163 |
| 6,304,249 B1 * | 10/2001 | Derocher et al. | | 345/163 |
| 7,623,117 B2 * | 11/2009 | Hsu | | 345/163 |
| 8,054,292 B1 * | 11/2011 | Forde et al. | | 345/163 |
| 8,537,116 B2 * | 9/2013 | Yang | | 345/163 |
| 2013/0215030 A1 * | 8/2013 | Lee et al. | | 345/163 |

* cited by examiner

*Primary Examiner* — Anthony Haughton
(74) *Attorney, Agent, or Firm* — Cheng-Ju Chiang

(57) ABSTRACT

A mouse structure includes a housing defining an opening and accommodating space therein, a pair of track devices fixed onto the housing in the accommodating space, a sliding device slidably coupled with the pair of track devices. Each track device has a sliding channel, a first position portion, and at least a second position portion. A limiting side is formed at an end of the sliding channel. The sliding device includes a base portion and an operating portion, the operating portion having a first rod and at least a second rod. When the sliding device slides along the sliding channels for use, the first rods are firstly retained by the limiting sides, and then moved upwards to allow the first and second rods to be located at the first and second position portions respectively, where the base portion is in alignment with an upper wall of the housing.

8 Claims, 5 Drawing Sheets

MOUSE STRUCTURE

BACKGROUND OF THE INVENTION

1. Field of the Invention

The present invention relates to a mouse, and particularly to a mouse structure that is retractable, less space occupied when not in use, and extendable for use.

2. Related Art

Types and shapes of electronic mice are many and various. Whatever the type or shape of a conventional mouse is it has a physical size which occupies a certain space whenever it is in use or not. Although a mouse can be designed as small size, they are merely suitable for users of smaller palms but not for most users.

Hence, referring to FIG. 1, a mouse 9 is improved to have a retracting portion 92 which is retractable into a casing 91 of the mouse 9 in order to reduce the size when not in use, wherein the retracting portion 92 slides along two side walls of the casing 91 to move in and out of the casing 91. However, when the retracting portion 92 moves out of the casing 91, an upper face of the retracting portion 92 retains an elevation difference and a large gap with an upper wall of the casing 91, leading to an inappropriate position with respect to the casing 91 (as shown in FIG. 2). As a result, such inappropriate position may cause the retracting portion 92 to move back to the casing 91 while the mouse is in use and seriously affect the use of the mouse. Therefore, it is imperative to overcome the aforesaid drawbacks of the conventional mouse by improving it to avoid an elevation difference and reduce a gap between the casing and the retracting portion.

SUMMARY OF THE INVENTION

Accordingly, an object of the present invention is to provide a mouse structure which is easily and quickly to use and is retractable to reduce an overall size for storage, and to extend in alignment for use.

To achieve the above-mentioned object, a mouse structure of the present invention comprises a housing having upper and lower walls, two side walls connecting the upper and lower walls, an accommodating space defined by the upper, lower and side walls, and an opening defined at one end of the accommodating space. A pair of track devices are fixed onto the two side walls of the housing in the accommodating space. Each of the track devices comprises a sliding channel, a first position portion, and at least a second position portion spaced apart from the first position portion, the first and second position portions located above the sliding channel and communicating with each other over the sliding channel. A limiting side is formed at an end of the sliding channel adjacent to the opening. A sliding device slidably coupled with the pair track devices comprises a base portion and an operating portion connected to the base portion, the operating portion having a first rod and at least a second rod both formed on opposite sides of the operating portion. The first and second rods are slidably engagable with the first and second position portions of the pair of track devices, respectively.

In accordance with the present invention, the limiting sides are disposed much closer to the opening than the first position portions.

With the above-mentioned structure, when the sliding device slides along the sliding channels with the first and second rods towards the opening to for use, the first rods are firstly retained by the limiting sides, and then are moved upwards to allow the first and second rods to be located at the first and second position portions respectively, where the base portion is completely out of the opening, and an upper surface of the base portion is in alignment with the upper wall of the housing.

DESCRIPTION OF THE PREFERRED EMBODIMENTS

Figure 1:
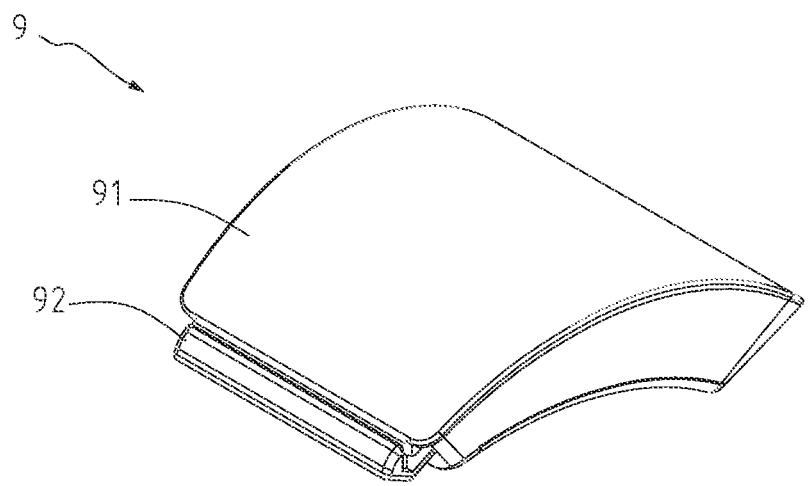
FIG. 1 is a perspective view showing a conventional mouse being retracted.
Figure 2:
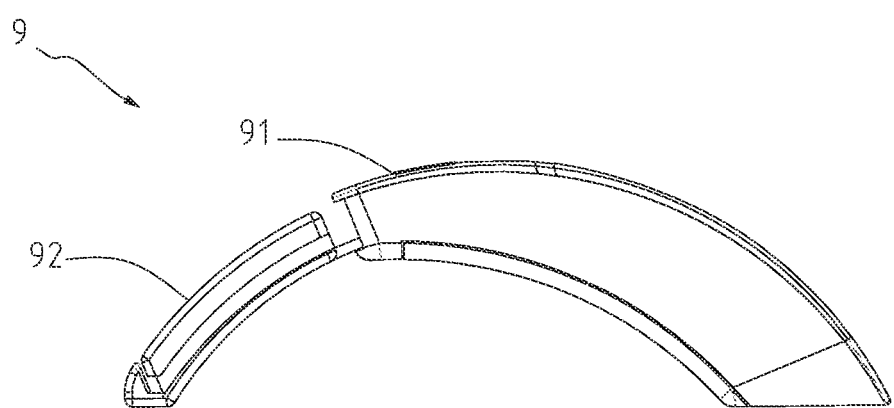
FIG. 2 is the conventional mouse of FIG. 1 being extended.
Figure 3:
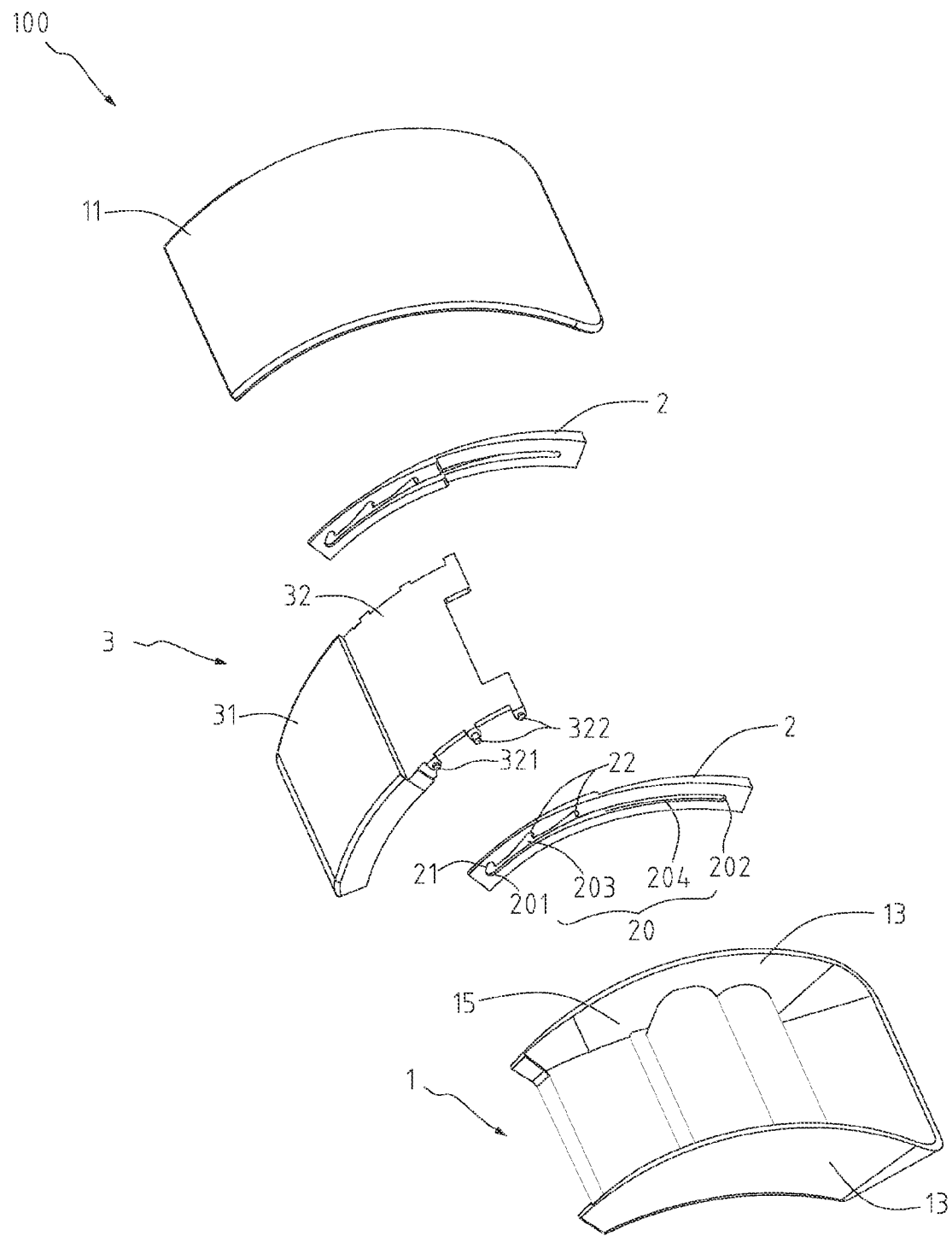
FIG. 3 is an exploded perspective view of a mouse structure of the present invention.
Figure 4B:
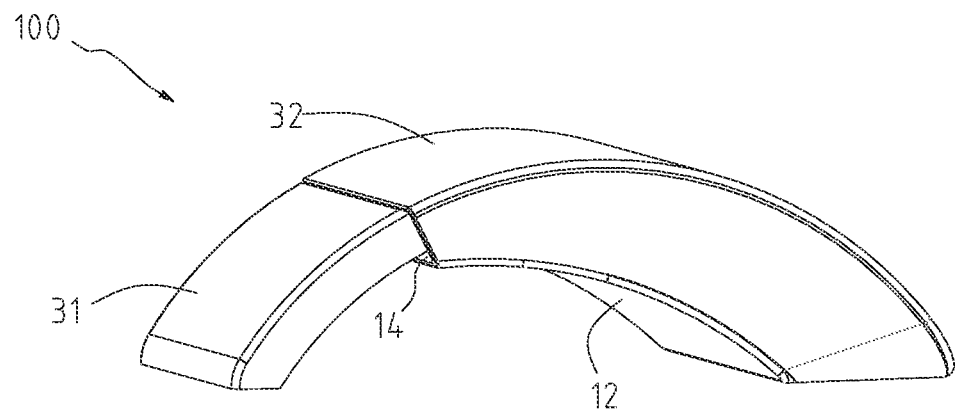
FIG. 4B is the mouse structure of FIG. 4A in a state of use.
Figure 4A:
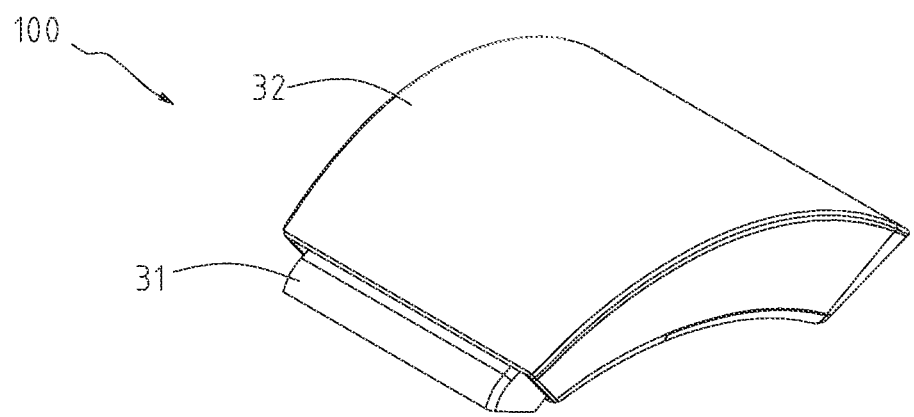
FIG. 4A is a perspective assembly view of the mouse structure in a state of close according to the present invention.
Figure 5:
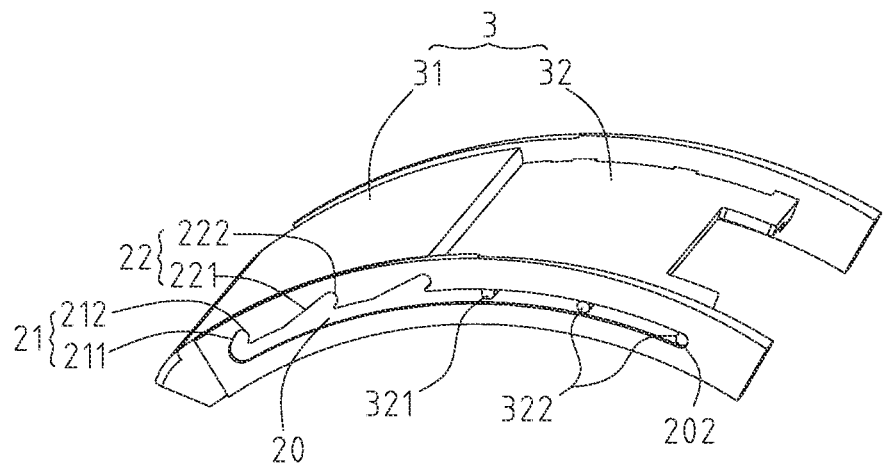
FIG. 5 is a perspective view of a sliding device and a pair of track devices of the mouse structure in the state of close according to the present invention.

Referring to FIGS. 3 to 5 illustrating a preferable embodiment of the present invention, a mouse structure 10 of the present invention comprises a housing 1, a pair of track devices 2, and a sliding device 3. The hosing 1 has upper and lower walls 11, 12, two side walls 13 connecting the upper and lower walls 11, 12, an accommodating space 15 defined by the upper, lower and side walls 11, 12, 13, and an opening 14 defined at one end of the accommodating space 15. In the preferable embodiment, the upper and lower walls 11, 12 of the housing 10 are curved lengthwise, and the pair of track devices 2 and the sliding device 3 are also curved lengthwise corresponding to a curved angle of the upper wall 11, but the shape of the housing 2 is not limited thereby. With the curved structure, the sliding device 3 is capable of sliding a predetermined distance due to the curved angle and gravity.

Referring to FIGS. 3 and 5, the pair of track devices 2 are fixed onto the two side walls 13 of the housing 10 in the accommodating space 15. Each of the track devices 2 comprises a sliding channel 20, a first position portion 21, and two second position portions 22. The first and second position portions 21, 22 are evenly spaced apart from each other and all penetrate opposite sides of the track device 2 (as shown in FIG. 3). Further, the first and second position portions 21, 21 are located above the sliding channel 20 and communicating with each other over the sliding channel 20. The sliding channel 20 includes a front part 203 and a rear part 204, wherein the front part 203 is located adjacent to the opening 14 and forms a limiting side 201 at one end thereof, and the rear part 204 has a restraining side 202 formed at one end of the rear part 204. A total distance where the sliding device 3 slides is limited between the limiting side 201 and the restraining side 202. The first and second position portions 21, 22 respectively have guiding sides 211, 221 and curved sides 212, 222 extending from ends of the guiding sides 211, 221. Each of the guiding sides 211, 221 is angularly disposed with respect to the sliding channel 20 and forms an acute angle with the sliding channel 20. In other words, the guiding sides 211, 221 are tilted in a direction opposite to the opening 14, with ends of the guiding sides 211, 221 connecting the sliding channel 20, wherein the guiding side 211 of the first position portion 21 smoothly connects the limiting side 201. The limiting side 201 is disposed much closer to the opening 14 than the first position portion 21. Because the track device 2 is curved, the guiding side 201 of the first position portion 21 is shorter than the guiding sides 221 of the second position portions 22 in order to allow the sliding device 3 to be positioned in place and aligned with the upper wall 11 of the housing 10.

Referring to FIGS. 3 and 5, the sliding device 3 comprises a base portion 31 and an operating portion 32 connected to the base portion. The operating portion 32 has a first rod 321 and two second rods 322 formed on opposite sides of the operating portion 32 and projecting towards the sliding channel 20. The first and second rods 321, 322 are slidably engaged with the first and second position portions 21, 22 of the pair of track devices 2, respectively. The base portion 31 and the operating portion 32 form an elevation difference (as shown in FIG. 5) in such a way that an upper surface of the base portion 31 is above the operating portion 32 in order to facilitate alignment of the sliding device 3 and the housing 10 in a state of use.

Figure 6A:
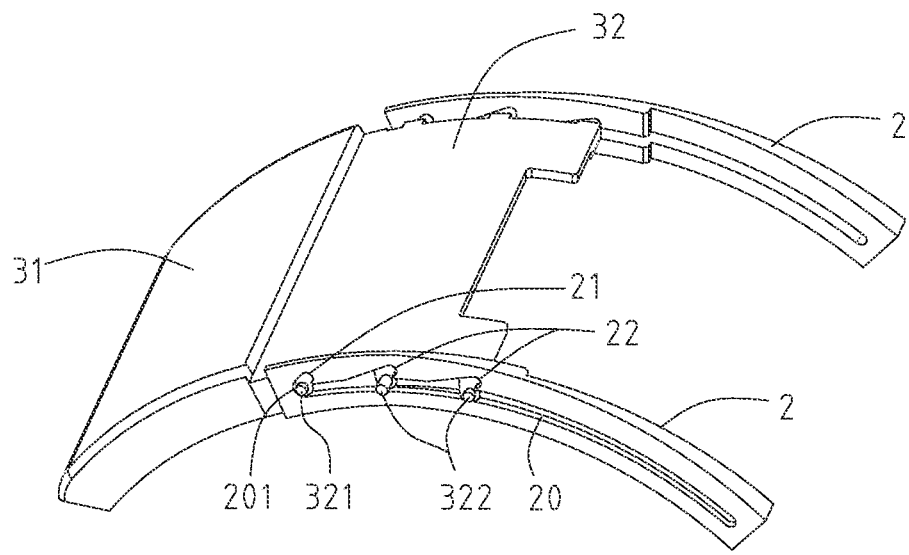
FIG. 6A is a perspective view schematically showing a sliding process of the sliding device.
Figure 6B:
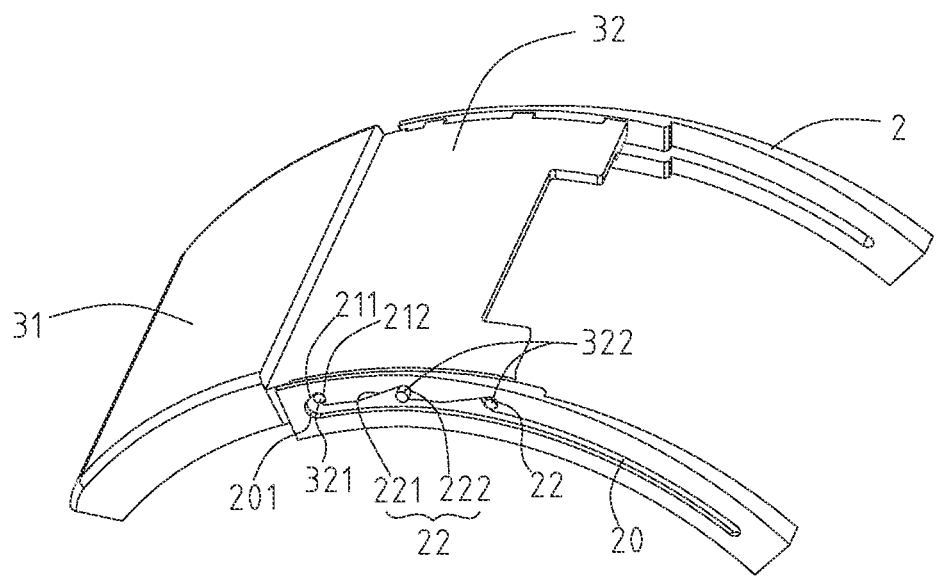
FIG. 6B is a perspective view schematically showing the sliding device is positioned in the state of use.

Referring to FIG. 5 and FIGS. 6A and 6B, when the mouse structure 100 is in a state of close or not in use, the operating portion 32 and most part of the base portion 31 are accommodated in the accommodating space 15, with one of the second rods 322 abutting against the restraining side 202 (as shown in FIG. 5). When the sliding device 3 slides along the sliding channels 20 with the first and second rods 31 and 32 towards the opening 14 to be in the state of use, the first rods 31 are firstly retained by the limiting sides 201 (as shown in FIG. 6A), and then move upwards and alone the tilting guiding sides 211 to abut against the curved sides 212 at the first position portions 21. At the same time, the second rods 322 move upwards and along the tilting guiding sides 221 to abut against the curved sides 222 at the second position portions 22, where the base portion 31 is completely out of the opening 14, and the upper surface of the base portion 31 is in alignment with the upper wall 11 of the housing 10 (as shown in FIGS. 4B and 6B). Furthermore, when the mouse structure 100 is in use, only one end of the base portion 31 opposite to the operating portion 32 and a bottom of the housing 10 are directly supported on a desk (not shown).

Likewise, when the mouse structure 100 is to be retracted into the housing 10, the sliding device 3 slides backwardly in a reverse direction with respect to the direction that the sliding device 3 sliding out of the opening 14. That is, the first and second rods 321 and 322 move away from the first and second position portions 21 and 22, and slide into the rear parts 204 of the sliding channels 20 so as to reduce the overall size of the mouse structure 100 (as shown in FIG. 4A). When the mouse structure 100 is in the state of use, the sliding device 3 of the mouse structure 100 retains no elevation difference with the upper wall 11 of the housing 10. Furthermore, with the engagement between the first and second rods 321 and 322 and the first and second position portions 21 and 22, the sliding device 3 is not likely to be retracted backwards to the accommodating space 15.

Figure 7:
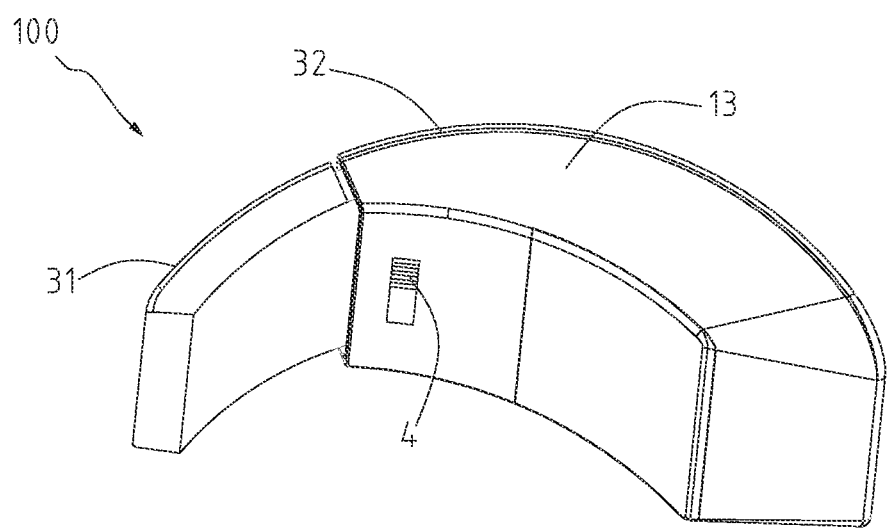
FIG. 7 is another perspective assembly view of the mouse structure of the present invention.

Furthermore, as shown in FIG. 7, the mouse structure 100 of the present invention may be further provided with a switch device 4 disposed at the lower wall 12, the switch device 4 having a switch element (not shown) mechanically connected to the sliding device 3 in order to control the sliding of the sliding device 3 so as to make the use of the mouse structure 100 more convenient.

Accordingly, the mouse structure 100 of the present invention utilizes the curved track devices 2 and the sliding device 3 to allow the mouse structure 100 to be extended for use or to be retracted for reducing the overall size, which provides the advantages of economizing a storing space and using conveniently and easily.

It is understood that the invention may be embodied in other forms within the scope of the claims. Thus the present examples and embodiments are to be considered in all respects as illustrative, and not restrictive, of the invention defined by the claims.

What is claimed is:

1. A mouse structure, comprising:
   a housing having upper and lower walls, two side walls connecting the upper and lower walls, an accommodating space defined by the upper, lower and side walls, and an opening defined at one end of the accommodating space;
   a pair of track devices fixed onto the two side walls of the housing in the accommodating space, each of the track devices comprising a sliding channel, a first position portion, and at least a second position portion spaced apart from the first position portion, the first and second position portions located above the sliding channel and communicating with each other over the sliding channel, a limiting side formed at an end of the sliding channel adjacent to the opening; and
   a sliding device slidably coupled with the pair of track devices, the sliding device comprising a base portion and an operating portion connected to the base portion, the operating portion having a first rod and at least a second rod both formed on opposite sides of the operating portion, the first and second rods being slidably engaged with the first and second position portions of the pair of track devices, respectively;
   wherein when the sliding device slides along the sliding channels with the first and second rods towards the opening for use, the first rods are firstly retained by the limiting sides, and then are moved upwards to allow the first and second rods to be located at the first and second position portions respectively, where the base portion is completely out of the opening, and an upper surface of the base portion is in alignment with the upper wall of the housing; and
   wherein the first and the at least a second position portions each has a guiding side and a curved side extending from one end of the guiding side, the guiding side is angularly disposed with respect to the sliding channel and forms an acute angle with the sliding channel, the guiding side of the first position portion smoothly connects the limiting side, and the first rod is firstly retained by the limiting side and then moves along the guiding side to abut against the curved side at the first position portion for use of the mouse structure.

2. The mouse structure of claim 1, wherein the limiting sides are disposed closer to the opening than the first position portions.

3. The mouse structure of claim 1, wherein the guiding side of the first position portion is shorter than that of the at least a second position portion.

4. The mouse structure of claim 1, wherein the sliding channel includes a front part and a rear part, the front part being located adjacent to the opening and provided with the limiting side, the first position portion, and the at least a second position portion.

5. The mouse structure of claim 1, wherein the pair of track devices each has a plurality of the second position portions, the first and second position portions being evenly spaced apart from each other.

6. The mouse structure of claim 5, wherein the other end of the sliding channel is formed with a restraining side, and when the sliding device is in a state of close, one of the second position portions being adjacent to the restraining side is restrained by the restraining side, where the operating portion and most of the base portion are being accommodated in the accommodating space.

7. The mouse structure of claim 1, wherein both the upper and lower walls of the housing are curved lengthwise, and the pair of track devices and the sliding device are curved lengthwise corresponding to a curved angle of the upper wall of the housing.

8. The mouse structure of claim 1, wherein the base portion and the operating portion form an elevation difference in such a way that the upper surface of the base portion is above the operating portion in order to facilitate alignment of the sliding device and the housing in the state of use.

* * * * *